Jan. 12, 1971 K. F. MEATES 3,553,882
MEANS FOR LOCKING A WHEEL TO A SHAFT AND
FOR SECURING A HANDLE TO THE WHEEL
Filed Dec. 13, 1967 2 Sheets-Sheet 1

INVENTOR
KEVIN FRANCIS MEATES

INVENTOR
KEVIN FRANCIS MEATES

United States Patent Office 3,553,882
Patented Jan. 12, 1971

3,553,882
MEANS FOR LOCKING A WHEEL TO A SHAFT AND FOR SECURING A HANDLE TO THE WHEEL
Kevin F. Meates, 6 Clifford Ave., Christchurch 1, New Zealand
Filed Dec. 13, 1967, Ser. No. 690,326
Claims priority, application New Zealand, Oct. 19, 1967, 150,419
Int. Cl. A63h 33/08
U.S. Cl. 46—16                                   1 Claim

ABSTRACT OF THE DISCLOSURE

A wheel element for a toy construction kit formed on opposite faces with projections and recesses disposed parallel to the rotational axis of the wheel element, and arranged so that the wheel element can be connected thereby to similar, coaxially disposed wheel elements and/or to separate means for clamping the wheel element to a shaft.

---

The invention relates to wheel elements for toy construction kits, particularly those kits comprising structural elements formed with and connected by projections and recesses.

Conventional toy construction kits commonly include different kinds of wheel elements, such as road wheels, pulley wheels, and gear wheels, which can be mounted on shafts provided in the kits.

Various means are adopted in different kits for enabling at least some of the wheel elements to be fixed to the shafts to rotate therewith and serve, for example, as drive wheels. In some kits, some of the wheel elements are formed with integral fixing means, such as a key engageable in a keyway on the shaft, or a hub securable to the shaft by a set-screw, or a hub-like collet having an external slotted cone which can be clamped to the shaft by means of a collet nut screwed on the collet and having an internal cone which tightens over the external cone of the collet.

In other kits, special locking washers are provided for engagement with the wheel elements and the shafts so as to fix the wheel elements to the shafts, the wheel elements being otherwise freely rotatable on the shafts.

Because it is frequently desired that the wheel elements of a toy construction kit form a free running fit on the shafts of the kits, it is wasteful to form each wheel element with integral fixing means as mentioned above. Also, when such means take the form of axially projecting hubs or collets, the axial thickness of the wheel elements, and consequently the width of any group of wheel elements secured together on a common shaft, are unnecessarily increased.

Even when locking washers, as mentioned above, are used for fixing the wheel elements to their shafts, wheel elements mounted adjacent to each other on a common shaft can only be connected together indirectly by clamping them individually to the shaft, and for this purpose a separate locking washer is required for each wheel element, again usually increasing the width of a group of wheel elements secured to a common shaft. Often, these locking washers are such as to be easily lost or broken.

One object of the present invention is the provision of a wheel element adapted to be a running fit on a shaft provided in a toy construction kit, and adapted to be easily connected to adjacent, coaxial wheel elements and/or to separate means for clamping the wheel element, or a group of interconnected coaxial wheel elements, to the shaft when required.

Another object of the invention is the provision of a wheel element adapted to be easily connected to the structural elements provided in the toy construction kits, if they are formed with projections and recesses as hereinbefore mentioned.

Other objects and advantages of the invention will be apparent from the following description.

According to the invention, a wheel element for a toy construction kit is adapted to be a running fit on a shaft provided in a toy construction kit, and is formed on opposite faces with a plurality of projections and a plurality of recesses disposed parallel to the rotational axis of the wheel element and arranged so that the wheel element can be connected thereby to similar, coaxially disposed wheel elements and/or to separate means for clamping the wheel element to the shaft when required.

Preferably, the said separate means for clamping the wheel element to the shaft comprise a sleeve adapted to be a sliding fit on the shaft and formed at one end with an external screw-thread and a slotted, external cone, and at the other end with a flange having recesses therein adapted to receive the projections on the wheel element; and a nut formed with a coacting, internal screw-thread and a coacting, internal cone.

Preferably, also, the arrangement of the projections on, and the recesses in, the wheel element corresponds with projections and recesses, so that the wheel element provided in the toy construction kit, if they are formed with projections and recesses, so that the wheel element can be connected to the said structural elements.

Two embodiments of the invention will now be described, by way of example only, with reference to the accompanying drawings, of which:

Figure 1:
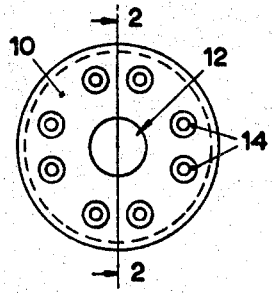
FIG. 1 shows a front elevation of a wheel element according to one embodiment of the invention.
Figure 2:
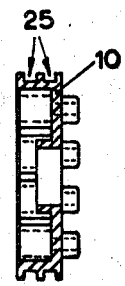
FIG. 2 shows a sectional view on the line 2—2 in FIG. 1.
Figure 3:
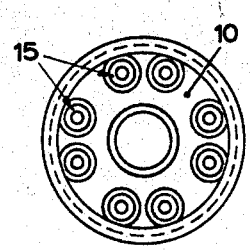
FIG. 3 shows a rear elevation of the wheel element according to the first embodiment.
Figure 4:
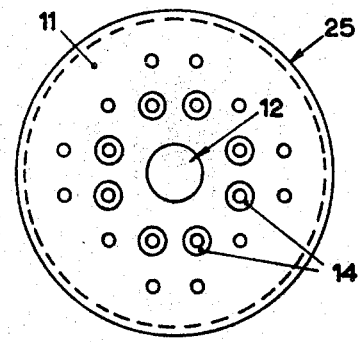
FIG. 4 shows a front elevation of a wheel element according to a second embodiment of the invention.
Figure 5:
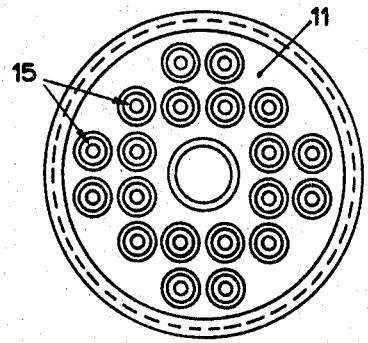
FIG. 5 shows a rear elevation of the wheel element according to the second embodiment.
Figure 6:
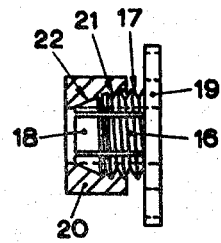
FIG. 6 shows a part sectional side elevation of separate means for clamping the wheel elements to the shafts provided in the toy construction kit when required.
Figure 7:
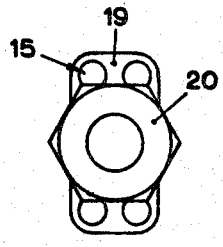
FIG. 7 shows an end elevation thereof.
Figures 8, 9:
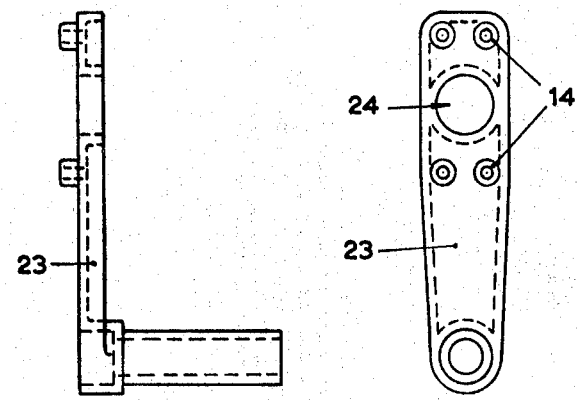
FIG. 8 shows a side elevation of a handle for turning the wheel elements.
FIG. 9 shows an end elevation thereof.
Figure 10:
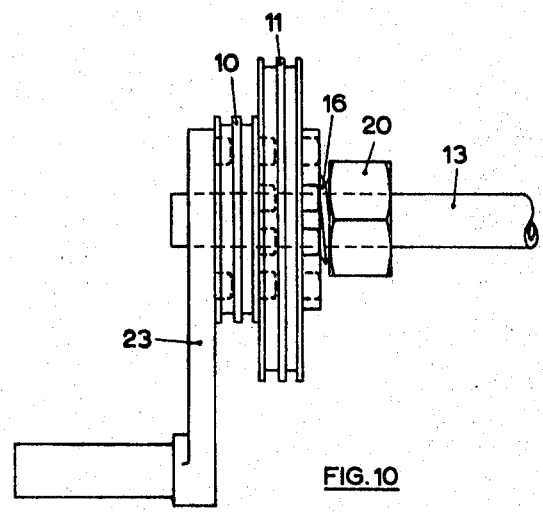
FIG. 10 shows an assembly of the wheel elements, the clamping means, and the handle, fitted on a shaft of the toy construction kit.

Referring now to the drawings, two wheel elements 10 and 11 for a toy construction kit are both formed in the centre with a hole 12 so that they are a running fit on a conventional shaft 13 provided in the toy construction kit, and on opposite faces with a plurality of projections 14 and a plurality of recesses 15. The projections 14 and the recesses 15 are disposed parallel to the rotational axes of the wheel elements 10 and 11, and are arranged so that the wheel elements 10 and 11, when disposed coaxially, can be interconnected thereby.

The wheel elements 10 and 11 can be clamped to the shaft 13 by separate means comprising a sleeve 16 adapted to be a sliding fit on the shaft 13 and formed at one end with an external screw-thread 17 and a slotted, external cone 18, and at the other end with a flange 19 having recesses 15 therein arranged to receive the projections 14 on the wheel elements 10 or 11, and a nut 20 formed with a coacting, internal screw-thread 21 and a coacting, internal cone 22. The flange 19 could of course be formed with projections similar to the projections 14 of the wheel elements 10 and 11, in place of the recesses 15.

The wheel elements 10 and 11, besides being connected to one another and to the flange 19 of the sleeve 16, can also be connected to an element such as a handle 23 which is formed with a hole 24, so that it is a running fit on the shaft 13, and with projections 14 arranged to engage in the recesses 15 in the wheel elements 10 or 11. The handle 23 could of course be formed with recesses similar to the recesses 15 of the wheel elements 10 and 11, in place of the projections 14.

The peripheries of the wheel elements 10 and 11 are shown to be formed with grooves 25, but they could also be formed so as to provide toothed gear wheels, or wheels for toy railways, or wheels for toy cars and lorries. Alternatively, the construction kit may include annular elements shaped as tyres, ring gears, or railway wheel flanges, which can be fitted around the wheel elements 10 and 11 to engage in the grooves 25 and adapt the wheel elements 10 and 11 for different uses, as desired.

The arrangement of the pojections 14 and recesses 15 on the wheel elements 10 and 11 corresponds with the arrangement used on the structural elements provided in the toy construction kit, if those structural elements are formed with projections and recesses, so that the wheel elements 10 and 11 can be connected to the said structural elements.

It will be apparent from the drawings that the wheel element 10 can be connected to one face of the wheel element 11 in an eccentric arrangement, and that the handle 23 can be used as a crank.

The wheel elements provided by the invention are far more adaptable than any wheel elements used hitherto in toy construction kits, and the separate means for clamping the wheel elements to the shafts provided in the toy construction kits overcomes the disadvantages of integral fixing means hereinbefore described.

I claim:

1. A wheel element assembly for a toy construction kit comprising a wheel element having a central axle hole enabling said wheel element to be mounted in a free running fit on a shaft provided in the toy construction kit, and means separate from said wheel element for securing said wheel element to the shaft on which it is mounted, the improvement comprising said wheel element having male and female connecting means comprising a plurality of projections formed on one face thereof and a plurality of recesses formed on the opposite face thereof, said projections and recesses extending in a direction parallel to the axis for the axle hole in said wheel element, said projections and recesses being arranged so that with two said wheel elements mounted coaxially in side by side relationship on the shaft the projections on one said wheel element are matingly engageable within said recesses in the other said wheel element, said separate means being slidably positionable on the shaft and comprising a first element having connecting means on a surface thereof for mating engagement with one of said male and female connecting means on said wheel when said first element is mounted on the shaft, said separate means further including a second element slidably positionable on said shaft and lockingly engageable with said first element for securing said first element on said shaft whereby said wheel elements engaged to said first element are secured in position on said shaft, a handle arranged to be mounted on the shaft in engagement with said wheel element for rotating said wheel element when it is locked on said shaft by said separate means, said handle comprising a longitudinally extending arm and a gripping element extending substantially perpendicularly from one end of said arm, said arm having a hole therethrough at a position longitudinally spaced from said gripping element with the hole arranged to fit in sliding engagement with the shaft, said arm having connecting means including a plurality of projections extending from one face thereof and arranged to be matingly engaged within the corresponding said recesses in said wheel element whereby said handle can be attached to said wheel element with said wheel element lockingly secured to the shaft for rotating said wheel element and shaft.

References Cited

UNITED STATES PATENTS

| | | | |
|---|---|---|---|
| 1,868,496 | 7/1932 | Gilbert | 46—23 |
| 3,233,358 | 2/1966 | Dehm | 46—23X |
| 3,236,004 | 2/1966 | Christiansen | 46—23 |
| 3,234,683 | 2/1966 | Christiansen | 46—23X |

F. BARRY SHAY, Primary Examiner

U.S. Cl. X.R.

46—23